United States Patent [19]

Bromley

[11] Patent Number: 5,445,376
[45] Date of Patent: Aug. 29, 1995

[54] CONVEYOR PLAYING SURFACE GAME

[75] Inventor: Lauran Bromley, Chicago, Ill.

[73] Assignee: Bromley Incorporated, Northbrook, Ill.

[21] Appl. No.: 181,418

[22] Filed: Jan. 14, 1994

[51] Int. Cl.⁶ .............................................. A63F 7/02
[52] U.S. Cl. .................... 273/109; 273/108; 273/113; 273/118 R; 273/118 A
[58] Field of Search ............... 273/108, 109, 113, 118, 273/119

[56] References Cited

U.S. PATENT DOCUMENTS 5,066,014 11/1991 Dobson ....................... 273/118 R X
5,213,325 5/1993 Malavozes et al. ............. 273/109 X

FOREIGN PATENT DOCUMENTS 1031011 5/1966 United Kingdom ................ 273/109

Primary Examiner—Raleigh W. Chiu
Attorney, Agent, or Firm—Breneman & Georges

[57] ABSTRACT

A moving playing surface amusement game having an object chute disposed at one end and one or more targets disposed at the other end and a movable conveyor playing surface disposed intermediate the object chute and targets. The conveyor playing surface game includes a microprocessor and a device for sensing the position of an object on the conveyor playing surface in a particular lane or sequencing the speed of the conveyor playing surface with a particular spot on the conveyor playing surface which playing surface can include a variety of surface ornamentations and diverters to change or maintain the path of the object on the conveyor playing surface. The novel conveyor coin game may include multiple conveyors some of which may operate at different speeds and in forward and reverse directions and which may be inclined and/or segmented to teach or test skills in timing and properly judging speeds, distances and relative motions of the movable playing surface and the movement and path of a moving object deposited on the conveyor playing surface in relation to the objects' mass and shape.

20 Claims, 10 Drawing Sheets

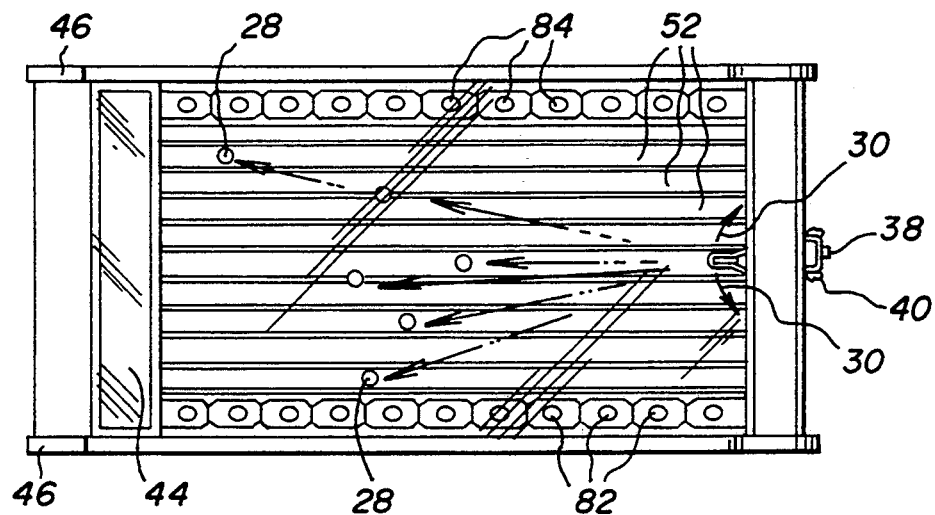
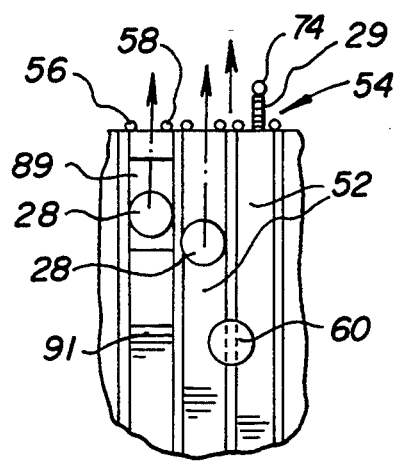
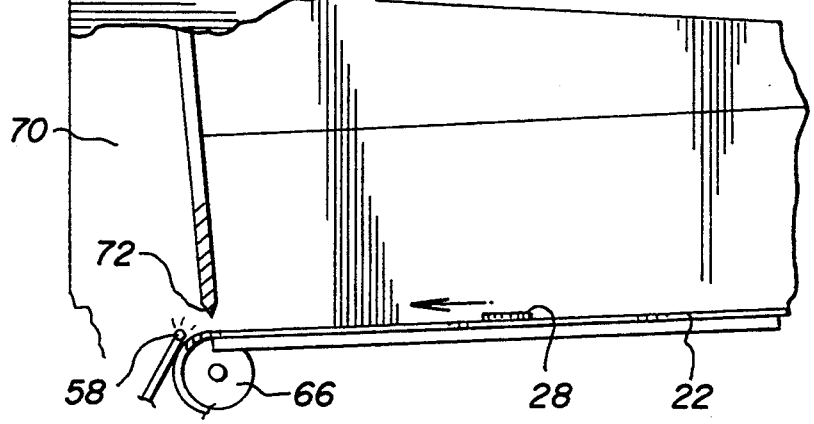

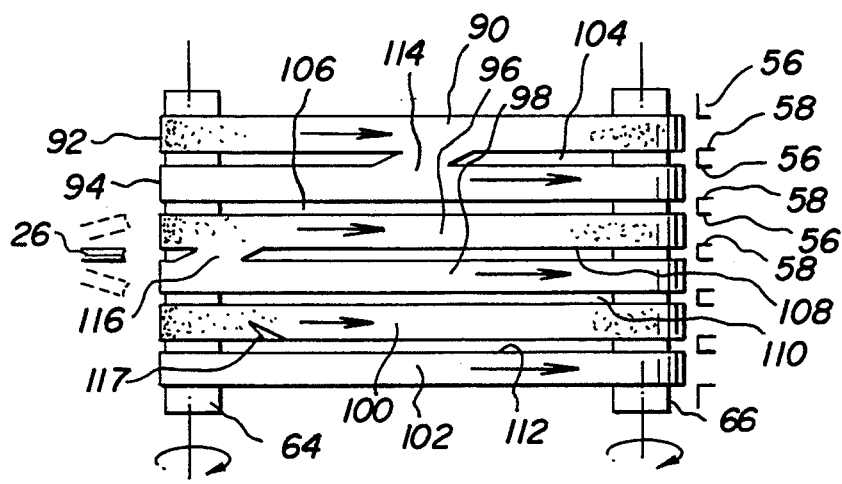
Fig. 6
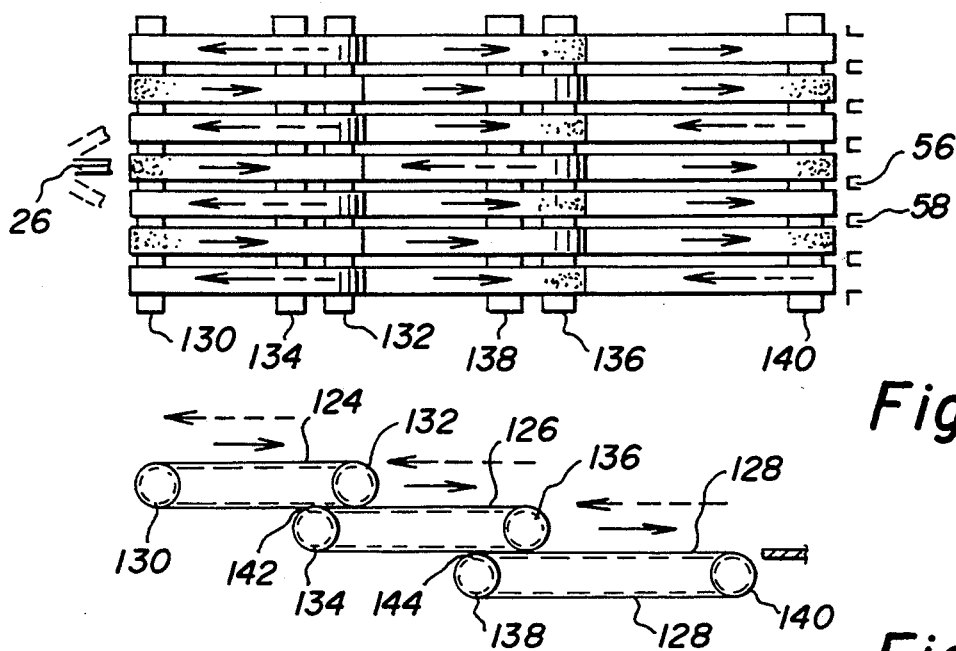
Fig. 7
Fig. 8
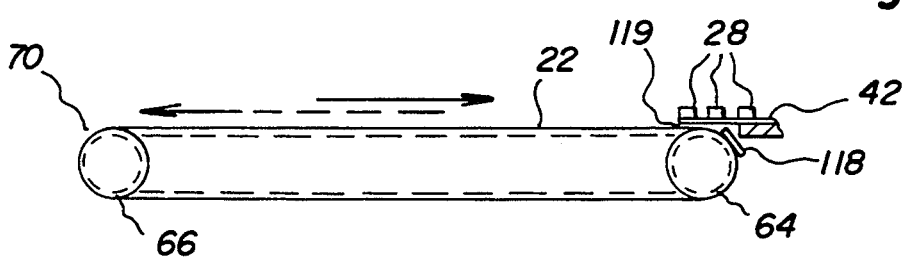
Fig. 9

CONVEYOR PLAYING SURFACE GAME
BACKGROUND OF THE INVENTION

1. Field of the Invention

The invention pertains to a game or device such as found in arcades or amusement parks in which one or more players compete to obtain prizes or tokens based upon their ability to direct coins or other movable objects deposited on a moving playing surface toward targets located at the end or sides of a moving playing surface. More particularly the invention pertains to an amusement game having a visible moving conveyor playing surface in which one or more conveyor playing surfaces are visible to the player and upon which the player deposits coins, tokens or other objects. The coins, tokens or other objects once deposited upon the conveyor playing surface are conveyed either solely by the movement of the conveyor playing surface or by a combined motion of the object together with the movement of the conveyor playing surface to advance the object to targets disposed at the other end or sides of the conveyor playing surface.

The novel game may utilize one or more visible conveyors which may be either flat or at a slight incline or decline toward the targets to contribute to the advancement of coins, tokens or other objects deposited on the conveyor playing surface toward the targets. The conveyor playing surface when formed from a plurality of conveyor playing surfaces may utilize a tiered or a sequenced arrangement in which an object deposited on one conveyor transfers the object on to a second conveyor and then on to additional conveyors alone or together with intermediate staging areas before the object is ultimately directed to a particular target. The speed of the visible conveyor playing surface may be controlled to operate either at a constant or varying rate of speed. The conveyor playing surface may also include surface ornamentation in the form of individual lanes which may be segmented and separately operated at varying rates of speed either in a forward or a reverse direction.

The game is designed to require considerable skill and teach or test skills of players in requiring hand and eye coordination together with judging rates of speed as well as the inertia of an object in order to advance the object to a particular target. In the preferred embodiment of the game a single conveyor playing surface is utilized in which less than the entire surface of the conveyor is visible to the player so that the conveyor playing surface appears as a flat moving playing surface.

Disposed at one end of the conveyor playing surface is a coin chute or other means for depositing coins, tokens or other objects on the conveyor playing surface. The targets are disposed at the other end of the conveyor surface having varying point values depending upon the level of skill and judgment required of the player to deposit a moving object in a particular lane or on a particular spot on the continuously moving conveyor playing surface in order to hit a particular target. The conveyor playing surface, targets and the end of the coin chute for depositing coins on the conveyor playing surface are enclosed from the player to prevent the player from changing the position of the coin or token once it is deposited on the conveyor playing surface.

The novel game contemplates the use of a computer program, associated microprocessors or microchips and electronics for activating the conveyor playing surface, calculating scores and possibly changing target values in response to the level of difficulty in positioning an object in a particular lane or on a particular spot on the conveyor playing surface in relation to the timed sequencing of the moving conveyor playing surface in relation to the target value. The microprocessor provides for the activation of LED light displays and speakers for providing visual and audible means for signalling the successful striking of targets by objects placed on the moving conveyor playing surface.

The movements of the conveyor playing surface together with the inertia of the moving object deposited on the conveyor playing surface is designed to teach and test skills of relative motion involving a moving object deposited onto a moving surface which moving surface acts upon the moving object to change its relative speed and course before the object reaches the target end of the conveyor playing surface. The novel game utilizing a conveyor playing surface simulates math and trigonometric problems which require skills in judging relative motions and velocities required for solving problems in navigation, ballistics and other disciplines in which the motion or movement of the medium must be anticipated in order for an object to properly strike or navigate to a particular position.

2. Description Of The Prior Art

The prior art amusement devices include a wide variety of games which depend upon various permutations of skill and chance to win prizes. Bromley, et al. U.S. Pat. No. 5,071,127 includes a similar type game in which coins are deposited upon a stationary playing surface which coins roll toward a target. Bromley, et al. U.S. Pat. No. 5,071,127 however does not utilize a conveyor playing surface or a continuously moving playing surface which requires skill or judgment with respect to the relative motions of the coin and the playing surface.

None of the known prior art employs a conveyor belt which forms the playing surface and which requires the exercise of skill and judgment to coordinate distances, speeds and relative motions of an object plus the moving playing surface to strike a particular target. The only prior art known to use conveyors is Winchinsky, et al. U.S. Pat. No. 4,496,160 which employs a conveyor to move coins to a fixed non conveyor playing surface. Numerous other types of casino games such as Parker, et al. U.S. Pat. No. 5,120,060, Crompton U.S. Pat. No. 4,662,636 and Rogers U.S. Pat. No. 2,007,216 provide for various pachinko type maze coin games in which diverter pins, capture gates and other means are utilized to modify the path of a coin with respect to a stationary playing surface.

The known prior art does not include means for depositing a moving object such as a coin or token upon a moving conveyor playing surface in which the deposited object may come to rest on the conveyor playing surface before the conveyor playing surface transports the object to targets at the other end of the conveyor playing surface. The known prior art also does not include a game in which the inertia of a moving object must be judged in combination with the motion of the moving conveyor playing surface in order to properly advance the object to a target disposed at the target end of the conveyor playing surface. None of the known prior art utilizes a moving playing surface in which a timed sequence exists between the moving playing surface and the targets at the other end of the moving playing surface to identify a particular spot on the moving playing surface in relation to a particular target. The known prior art also does not include playing surfaces that are conveyor playing surfaces which are segmented into lanes, tiered, or tiered and oriented at angles to simulate drift and other physical phenomena and which are capable of moving at different relative speeds and in different relative directions with respect to the target to create various timed sequences and relative motions required to test judgment and skill in relative motions.

The novel game of the invention allows a wide variety of games to be implemented utilizing relative motions and timed sequences in combination with a microprocessor and associated computer program to test and impart high degrees of skill in judging distances and relative speeds in spacial and inertial relationships in order to obtain prizes, coins or other rewards for exercising the proper skill and judgment in depositing a moving object on the continuously moving surface to strike a particular target. As will be recognized the term conveyor playing surface includes multiple conveyors as well as segmented and non segmented conveyors which may also be time sequenced in relation to the target value to test spacial and inertial skills.

SUMMARY OF THE INVENTION

The invention pertains to an amusement game or device having a conveyor playing surface formed from most of the upper surface area of a conveyor belt disposed between a player end and a target end. The player end includes a means for depositing an object such as a coin or token along the width of the conveyor playing surface intermediate the player end and target end of the conveyor playing surface upon which an object once deposited by a combination of its own motion along with the motion of the conveyor playing surface results in the advancement of the object to one or more targets located at the target end. The target end includes the end of the conveyor playing surface opposite the player end as well as targets disposed at the sides adjacent to the player end of the conveyor playing surface. Targets can also be located at the player end where the conveyor playing surface is designed to move in a forward and reverse direction. The targets located at the sides or at the target end when struck by an object such as a token or a coin results in the distribution of rewards or prizes.

The invention may utilize a single conveyor or multiple conveyors to form a conveyor playing surface. The conveyors may be arranged in a coplanar sequential arrangement or in a tiered or layered relationship for moving an object deposited on the conveyor playing surface from the player end of the conveyor playing surface to the various targets at the sides of the conveyor playing surface. The conveyor playing surface may be in the form of a single conveyor belt or it may be segmented or formed from a plurality of single or individual conveyor belts. The conveyor playing surface when disposed as a single conveyor belt may optionally include surface ornamentation such as lanes divided into straight lines or wavy lines either parallel to the conveyor playing surface or non parallel thereto together with microprocessor means for the time sequence identification of a particular spot on the conveyor playing surface and sequencing that particular spot on the surface of the moving conveyor playing surface with the value of a target disposed on the other end of the conveyor playing surface for only the period of time when the target sensor is in alignment with the particular spot on the moving conveyor playing surface.

The novel game includes means, for depositing an object along the width of the conveyor playing surface and may include a plurality of slots or the utilization of a pivotal coin chute for depositing an object on the conveyor playing surface at or near the player end. Once the object is deposited along the width of the conveyor playing surface the object is advanced toward the targets by a combination of the inertia of the object and the movement of the conveyor playing surface to the target which can include various provisions for the forfeiture of the coin or object. The conveyor playing surface is substantially in constant movement during the play of the game forcing the player to judge relative speeds of the object and conveyor playing surface to successfully advance the object or coin from the object or coin chute to a particular target disposed around the sides or at the target end of the conveyor playing surface.

The novel game employs a conveyor playing surface which for purposes of the invention may move either in a forward direction or a reverse direction or a combination thereof as operated by the computer software while the coin or object is in play. The moving conveyor playing surface may be segmented into lanes with each of the lanes operating in different directions and different rates of speed. The conveyor playing surface may be designed to operate at different rates of speed by the utilization of separate drive motors for different drive rollers operating the conveyor playing surface or through the utilization of gears, varying sized idler pulleys and other means known to those skilled in the art for making each segmented lane of the conveyor playing surface move at different rates of speed and/or relative direction.

The novel game may include software and microprocessor means for controlling the game and imparting various dimensions in the game such as changing the target value of the targets at the target end of the game in timed sequence with the alignment of a particular spot or area on the moving conveyor playing surface. The timed changes in point value at the target end of the conveyor playing surface may be accomplished with software that provides different levels of skill for the game where a particular point value has been achieved after a more simplified version of the game has been played. Thereafter the same targets previously having fixed target values in relation to a particular lane may be changed to have varying target values in relation to a particular spot in the lane as opposed to the lane thereby requiring the player to further anticipate and judge the relative speeds of the object or coin deposited on the conveyor playing surface in combination with the speed of the conveyor playing surface.

The conveyor playing surface may also be modified to include embodiments where the object coin or token in play may be utilized to first strike another coin, token or other object piled or arranged in a staging area such as a shelf or ledge to push one or more of the coins, tokens or objects from the staging area onto the conveyor playing surface to thereafter be conveyed by the conveyor playing surface to one or more targets at the other end of the conveyor playing surface. The conveyor playing surface game may include a staging area at the target end of the conveyor playing surface so that the conveyor transports the coin or object to a staging area before causing the object to push another object piled on the staging area into the target. In addition the staging area may be disposed between two conveyors so that a coin or token moves from the first conveyor to the staging area to push a coin, token or object from the staging area onto the second conveyor which second conveyor transports the coin, token or object to the target.

The conveyor playing surface may also be inclined downwardly toward the target so that coins, tokens or other rollable objects advance toward the target as a result of both the inertia of the rollable object as well as the movement of the conveyor playing surface. The conveyor playing surface may also include lanes which are segmented and divided and include open spaces between the segments of the lane so that coins when deposited in non alignment with a particular lane fall through the open areas between the segments thus resulting in a forfeiture of the coin.

The conveyor playing surface may also include diverters, cross over areas and other types of mechanical means disposed on the surface of the conveyor playing surface or projecting above the surface of the conveyor playing surface to direct moving objects placed on the conveyor playing surface onto other segmented lanes, forfeiture holes, or to arrest the movement of the moving object and capture the object on a particular spot on the conveyor playing surface. The conveyor playing surface may include surface ornamentation such as wavy lines, signs or geometric figures which require the players to deposit the coin on a specific geometric figure or sign in order to be moved by the conveyor playing surface to a particular target at the other end of the conveyor playing surface.

The novel conveyor playing surface game requires and teaches considerable skill in judging distances, speeds and relative motions in order to strike a given target disposed at the target end of the conveyor playing surface which target end may be disposed at the side opposite the player end or the sides adjacent to the player end or at the player end where the conveyor playing surface moves in either a forward or reverse direction. The means for depositing a coin, token or other object along the width of the conveyor playing surface may be a plurality of slots disposed at the player end or one or more pivotal chutes which in combination with the movement of the conveyor playing surface advances the coin, token or object to the target which may be fixed or moving at the target end.

The movement of the target at the target end may be accomplished electronically by varying the point value or by mechanically moving the target by placing the target on a movable rack which is sequenced in relation to a particular point on the conveyor playing surface. The novel conveyor playing surface game as a result can test or impart skills in judging relative motions, distances and movements of objects which are valuable in teaching or acquiring skills in judging the relative movement of objects such as in navigation, ballistics and other problems in which the inertia of the object in combination with the relative movement of another medium provides a resultant motion which must be factored into the inertial navigational problem.

The game of the invention includes a cabinet for housing the means for depositing a coin, token or other object on the playing surface, a movable conveyor playing surface, one or more targets disposed around the perimeter of the conveyor playing surface and a transparent cover for closing the playing surface to prevent interference with the conveyor playing surface. The cabinet may also include a display and running lights to track the advance of objects to the target and lights in the display to indicate the target has been successfully struck. In addition the cabinet provides support for motors for moving the conveyor, optional sound means for indicating a successful hit and optional ticket or prize dispensers for awarding the prizes, tokens, coins or other rewards for the successful striking of targets.

DESCRIPTION OF THE DRAWINGS

The advantages of the invention will become apparent to those skilled in the art from the following detailed description of the invention in conjunction with the drawings in which:

FIG. 3 is a top plan view of the conveyor playing surface game of FIG. 1;

FIG. 4 is a fragmentary view of a portion of the conveyor playing surface of FIG. 2 at the target end;

FIG. 5 is a fragmentary side elevational view of the conveyor playing surface game;

FIG. 6 is a top plan view of an alternative embodiment for the conveyor playing surface;

FIG. 7 is a top plan view of a further embodiment of the conveyor playing surface;

FIG. 8 is a side elevational view of the conveyor playing surface of FIG. 7;

FIG. 9 is a side elevational view of a further embodiment of the conveyor playing surface game employing a token or object staging area;

DESCRIPTION OF THE APPENDIX ITEM

Appendix Item 1 is a computer printout of a computer program for the microprocessor controlled conveyor playing surface game constructed in accordance with the invention.

DETAILED DESCRIPTION OF THE INVENTION

The game of the invention utilizes a movable conveyor playing surface upon which coins, tokens or other objects are deposited upon which surface the deposited object either continues to roll by its own inertia to the target or comes to rest on the conveyor playing surface and is advanced to the target area by the movement of the conveyor playing surface. The deposited object may be deposited through a pivotal coin chute, series of slots along the width of the player end or other means for placing the object along the width of the conveyor playing surface. Staging areas may also be employed at various locations between the means for depositing the object and targets in order to allow the deposited object to push another object from a stationary position onto or off the moving conveyor playing surface or into the target. In this manner a combination of resulting movements of the conveyor playing surface and the inertia and position of the object along the width of the conveyor playing surface are required to be analyzed or computed in order to strike an object disposed at the target end of the conveyor playing surface.

The conveyor playing surface may be a single continuous conveyor belt or it may be segmented into a plurality of individual belts. The conveyor playing surface may be designed to move in forward and reverse directions thus requiring skill and timing in the placement of a coin, token or other object along the width of the conveyor playing surface in anticipation of the movement of the conveyor surface to transport the coin, token or object to the various targets.

Figure 1:
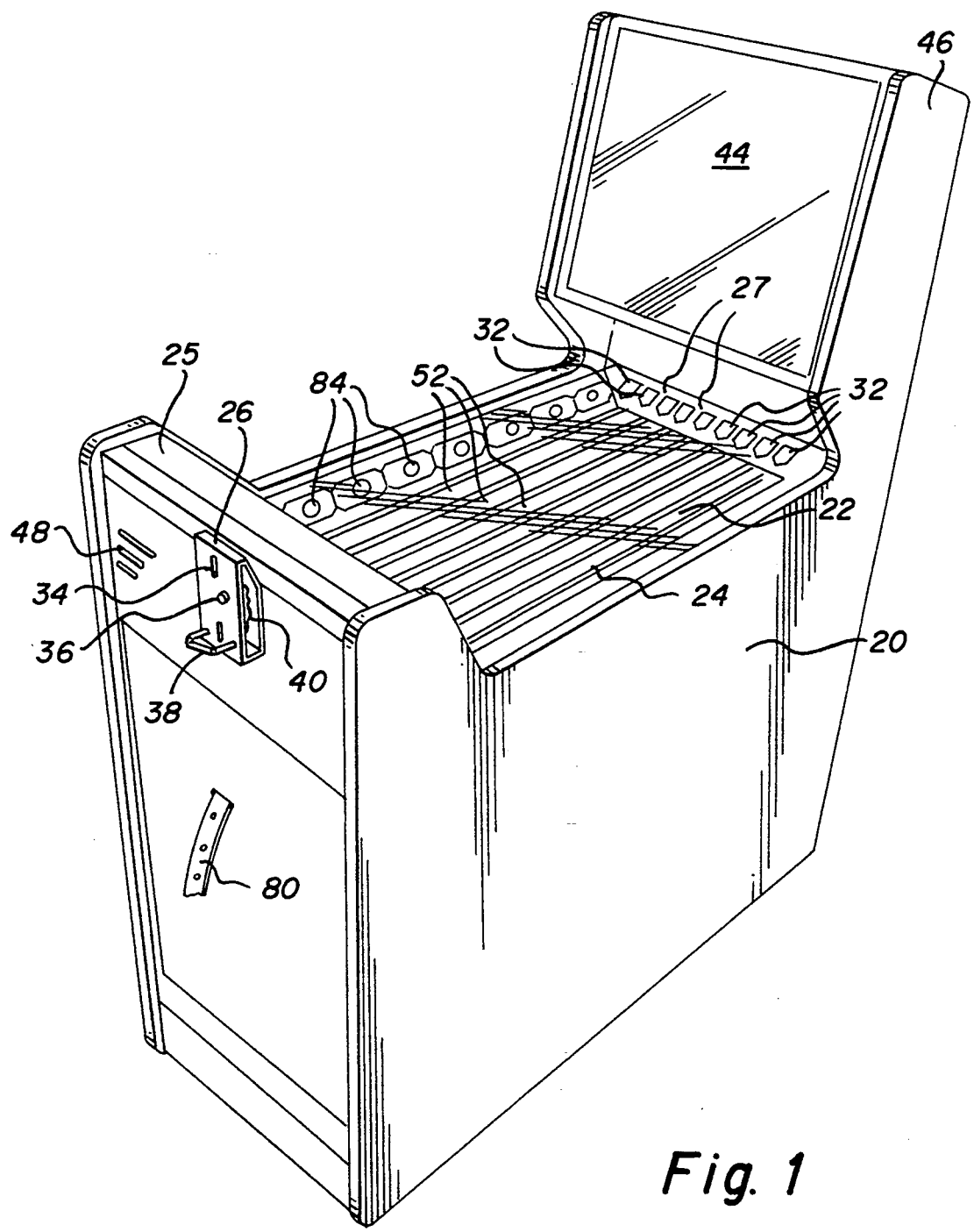
FIG. 1 is a perspective view of a conveyor playing surface game constructed in accordance with the invention.
Figure 2:
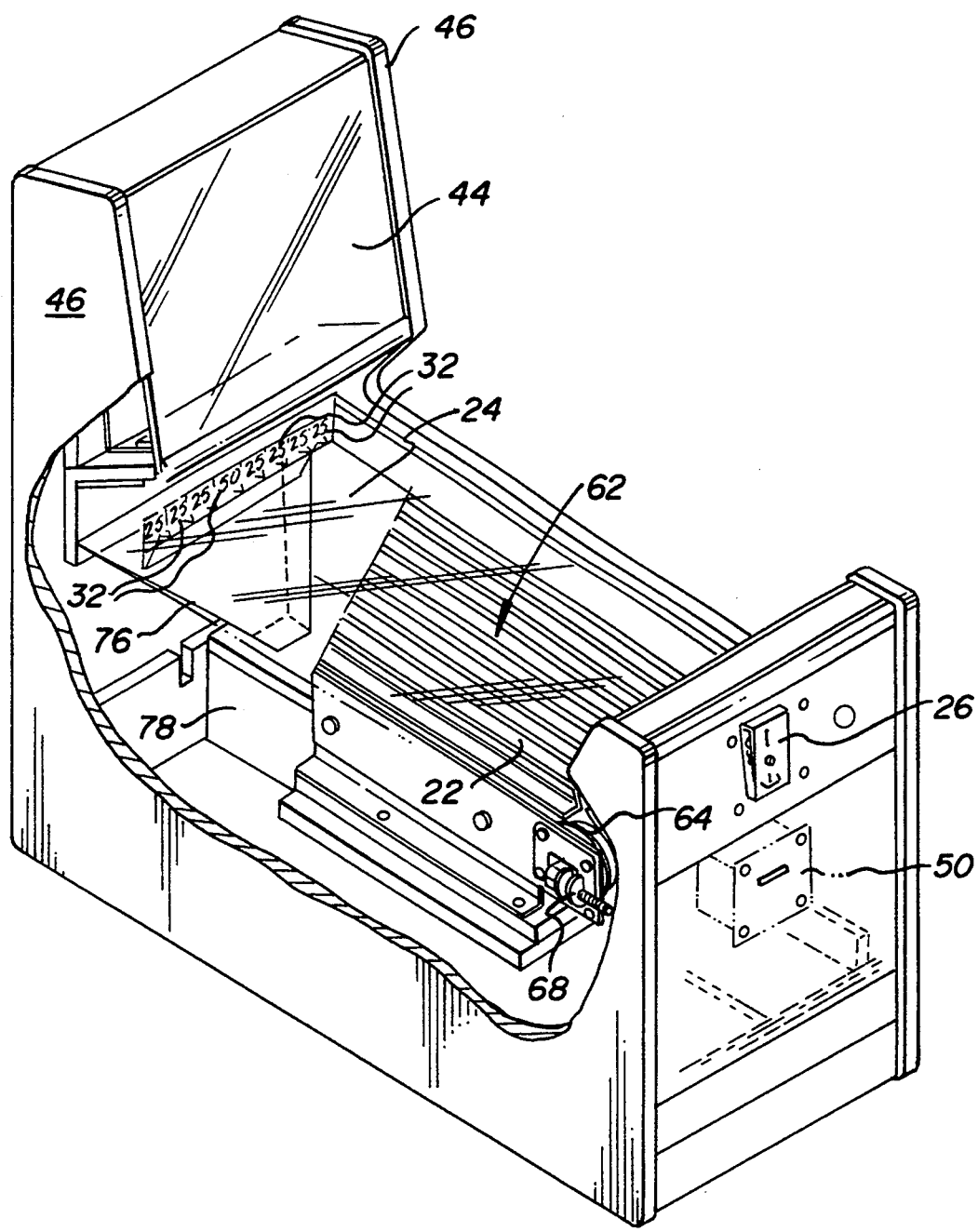
FIG. 2 is a perspective cut away view of the conveyor playing surface game of FIG. 1 illustrating various components disposed in the housing.

The novel conveyor playing surface game can either be housed in a table top housing (not shown) or an arcade cabinet type housing 20 as illustrated in FIG. 1. Referring now to FIGS. 1, 2, 3 and 5 housing 20 provides support for a conveyor playing surface 22 and a transparent cover 24 to isolate the conveyor playing surface from the player and prevent the handling, moving or otherwise allowing the repositioning of objects deposited on the moving conveyor playing surface 22. Disposed substantially at or near the player end 25 of the conveyor playing surface 22 is a means for depositing coins onto or near the player end 25 of the conveyor playing surface such as a pivotal chute 26. Pivotal chute 26 is capable of depositing coins, tokens or other objects 28 (FIG. 3) onto the conveyor playing surface 22.

The pivoting of pivotal chute 26 as depicted by arrows 30 (FIG. 3) assists in the depositing of coins, tokens or other object 28 at desired locations laterally across the width of the conveyor playing surface 22. In the best mode of the invention a coin, token or other object 28 is deposited on conveyor playing surface 22 with sufficient inertia to roll a distance along the conveyor playing surface 22 before it comes to rest on its side on the conveyor playing surface 22 which surface then completes the advance of the object 28 to one or more targets 32 disposed at the target end 27 of the conveyor playing surface 22.

The pivotal chute 26 includes a coin slot 34, a coin return button 36 for returning bent or damaged coins and a coin return guard 38. The pivotal chute 26 includes a hand grip 40 to allow the player to hold and pivot the pivotal chute 26 to deposit a moving coin or object onto the moving conveyor playing surface 22. Objects may also be deposited indirectly onto the conveyor playing surface 22 by utilizing a staging area 42 (FIG. 9) on which objects such as coins, tokens or other objects 28 may be stacked along the length of the staging area 42. In embodiments of the invention employing a staging area 42 as illustrated in FIG. 9 coins, tokens or other objects 28 stacked across the width of the staging area may be struck by a coin or other object 28 from pivotal chute 26 to move one or more coins, tokens or other objects from the staging area onto the conveyor playing surface 22. Staging area 42 can be located at the player end as illustrated in FIG. 9 or at the target end or anywhere intermediate thereto to allow objects transported by the conveyor playing surface to be pushed onto the staging area which object then pushes piled objects back onto the conveyor playing surface or into one or more of the targets.

The cabinet type housing 20 also includes a display 44 carried by two supports 46. Housing 20 also includes a speaker 48 as well as a ticket or prize dispenser 50 (FIG. 2) for dispensing tokens, tickets or other prizes when the player successfully hits one or more of the targets 32. The conveyor playing surface 22 may be segmented into lanes 52 by the application of surface ornamentation onto a unitary conveyor belt to assist the player in positioning a coin, token or object 28 in the lanes 52 which are in alignment with target detector means 54 (FIG. 4). Target detector means are associated with each of the targets 32 to allow coins, tokens or objects 28 when positioned in a lane 52 to contact a pair of spaced apart sensors 56 and 58 which determine if the object 28 is properly positioned in lane 52 to result in the award of a prize. Both objects 28 (FIG. 4) are properly in position in lanes 52 to result in the award of a prize whereas object 60 is out of position and will not result in the award of a prize since it will not contact a pair of spaced apart sensors 56 and 58 of the target detector means 54.

The conveyor playing surface 22 in the preferred embodiment is a single unitary conveyor belt 62 (FIG. 2) having surface ornamentation disposed between two rollers 64 and 66 (FIG. 5) which are designed to move conveyor playing surface in a forward or reverse direction by the counterclockwise and clockwise rotation of rollers 64 and 66. A belt tightening mechanism 68 (FIG. 2) is provided for tightly tensioning conveyor belt 62 between rollers 64 and 66. Once properly tensioned in housing 20 conveyor belt 62 appears through cover 24 as a flat moving playing surface.

Coins, tokens or objects 28 deposited on conveyor playing surface 22 through pivotal chute 26 travel on conveyor playing surface 22 as a result of the combination of the inertia of object 28 in combination with the rate of speed of conveyor playing surface 22. The coin, token or object 28 thus advances to the targets 32 as a result of its own motion in combination with the motion of conveyor playing surface 22 with the object partially rolling and subsequently falling to a side in the preferred embodiment of the invention before the object is finally advanced by conveyor playing surface 22 to contact sensors 56 and 58 at the target end 70 (FIG. 5) of the novel arcade game.

In the preferred embodiment of the invention cylindrical objects are used such as coins or tokens which are designed to fall on their side before contacting sensors 56 and 58. To assure the flattening of the coin, token or object 28 a flattening device 72 (FIG. 5) may be positioned across the width of conveyor playing surface 22 to make certain all coins, tokens or other objects on the playing surface come to rest on a side before reaching sensors 56 and 58. In other embodiments of the invention the optional coin or token or flattening device 72 may either not be present or be positioned along only a portion of the width of target end 70 so that coins, tokens or objects deposited on the conveyor playing surface may score points by either laying flat on their side as illustrated by objects 28 in FIG. 4 or additional points may be obtained by directing an object such as a coin or token on its edge the full length of the conveyor playing surface to contact a target detector means 54 for detecting the edge of the rolling object such as sensor 74 to score double, triple or some other multiple form of points such as illustrated by coin or token 29 in FIG. 4.

It will be recognized scoring of points can be accomplished by the object coming to rest on the conveyor playing surface 22 or by the object continuing to roll the entire length of the conveyor playing surface 22 or a combination thereof while the conveyor playing surface 22 continues to move. In various embodiments of the invention utilizing a rolling coin, token or object rolling the entire length of conveyor playing surface 22 it is preferable to have roller 64 at an elevation higher than roller 66 to provide a slight downward incline towards the targets to allow the incline to assist in the rolling of the coin token or object the entire distance toward the target on the moving conveyor playing surface.

Coins, tokens or objects 28 are designed to fall freely from the conveyor playing surface 22 as the conveyor rolls around roller 66 (FIGS. 2 and 5) into a coin chute trough 76 and thereafter into a coin vault 78. Targets that have been hit by activating sensors 56, 58 or 74 result in lighting up of the display 44 and the award of tickets 80 (FIG. 1) or other prizes from the ticket dispenser 50. In the event the game runs out of tickets while counting out a ticket award the balance due to the player can be displayed on a six digit display on the diagnostic PC board located inside the game front door or on the display.

Figure 15A:
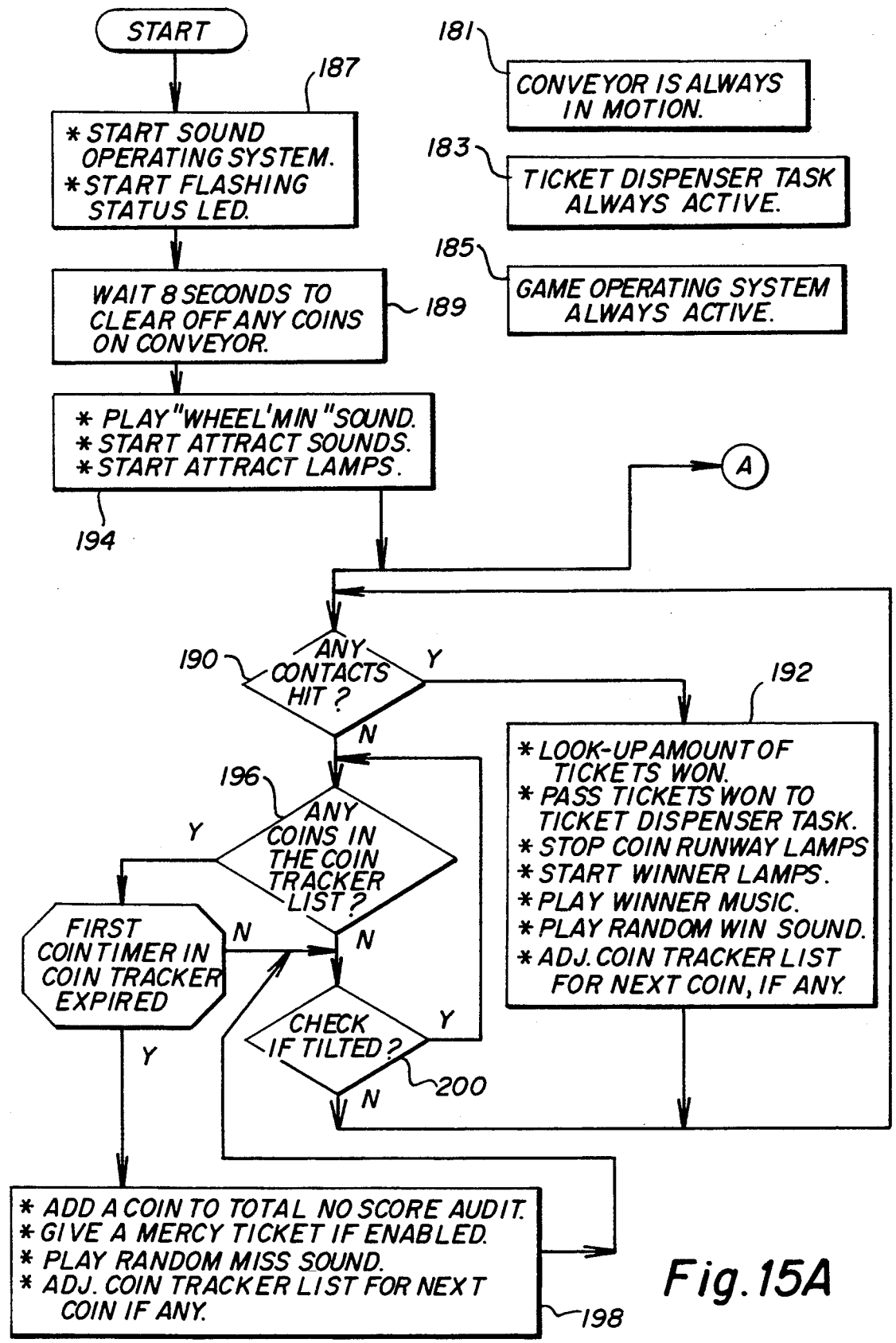
FIG. 15A and 15B is a flow chart illustrating the best mode for operating the conveyor playing surface game constructed in accordance with the invention.
Figure 15B:
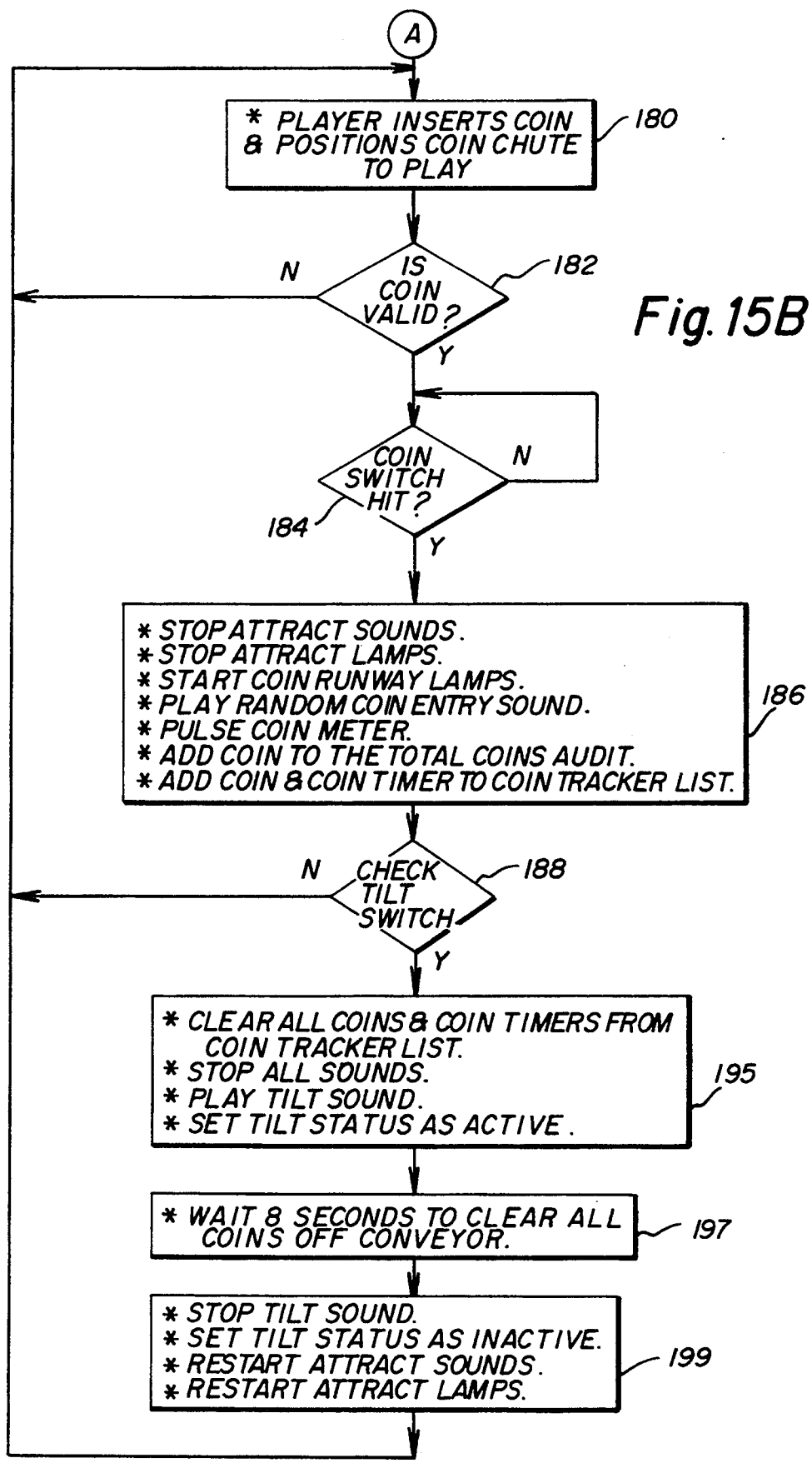
Figures 16, 16A:
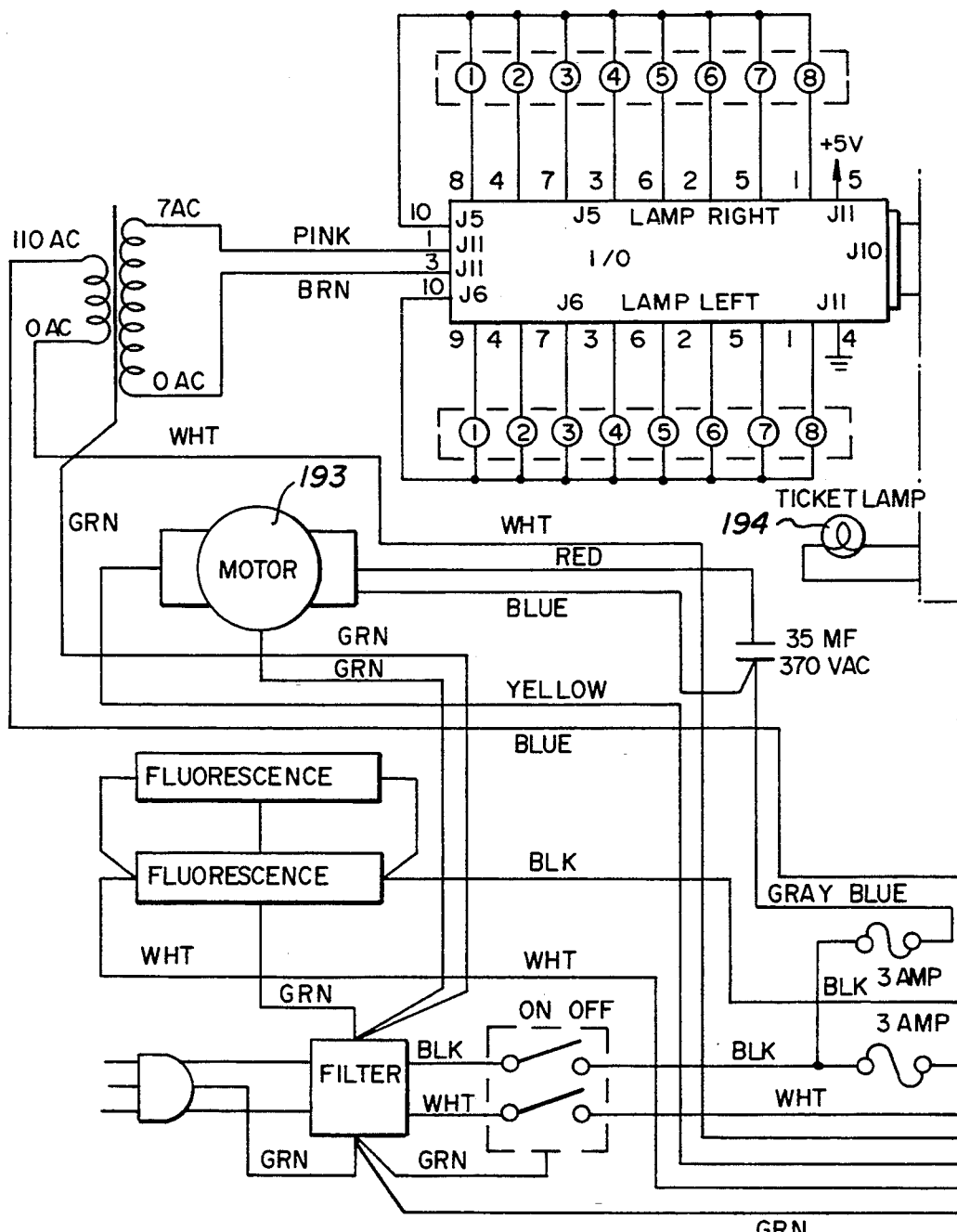
FIG. 16A and 16B is a circuit diagram of one embodiment of the electrical schematics for a conveyor playing surface game constructed in accordance with the invention.
Figure 16B:
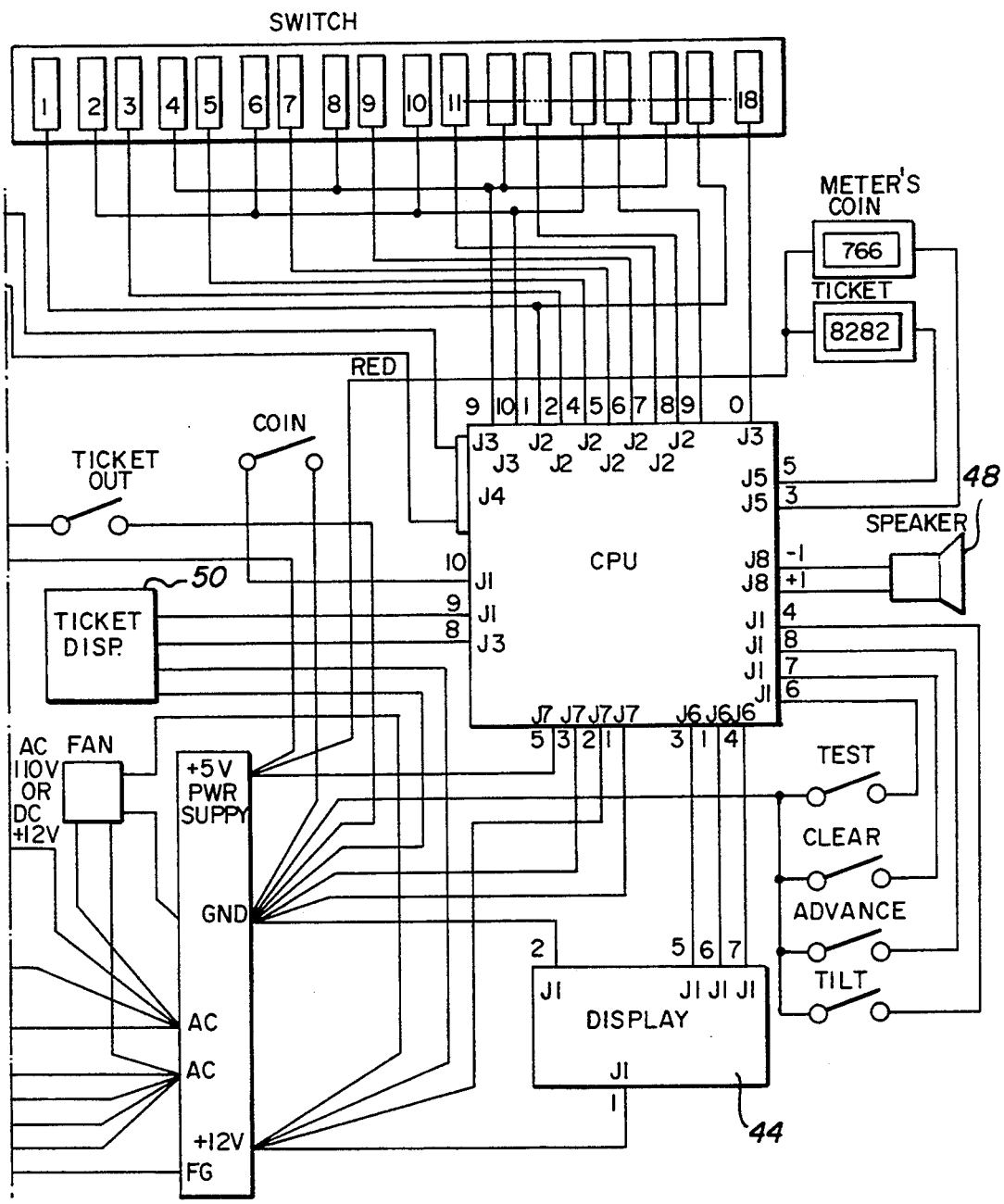

A plurality of side lights 82 and 84 (FIG. 3) may be provided in housing 20 on the sides adjacent to the player end 25 of the conveyor playing surface 22. Side lights 82 and 84 can be used as general purpose attract lights alone or together with speaker 48. Side lights 82 and 84 may also be sequenced to simulate the rate of speed and forward or rearward movement of the conveyor playing surface 22. Additionally side lights 82 and 84 may be utilized in conjunction with targets disposed on the sides of the conveyor surface as will be described in further detail with respect to FIG. 11. In FIG. 15A, 15B, 16 and the Appendix Item the best mode of operation for side lights 82, 84 together with display 44 and speaker 48 is illustrated in accordance with the preferred embodiment of the invention.

The surface ornamentation on conveyor playing surface 22 is not limited to lanes and a variety of geometrical patterns and shapes are contemplated. These shapes may be in the form of a rectangle 89 (FIG. 4) or a series of lines 91 or other types of figures or drawings which require the placement of the coin, token or object 28 directly on the figure in order to win a prize. The rate of speed of the novel conveyor playing surface 22 of the invention can then be sequenced with the turning ON or OFF of sensors 56 and 58 to make certain sensors 56 and 58 are ON only for the period of time rectangle 89 or lines 91 are in perpendicular alignment with sensors 56 and 58. In addition the point value ascribed to sensors 56 and 58 can be increased or decreased in timed sequence with the rate of speed of conveyor playing surface 22. The point value of the targets can be electronically changed in timed sequence with the movement of the conveyor playing surface so that any type of surface ornamentation can be used on the conveyor playing surface 22 to identify spots, lanes or segments of conveyor playing surface 22 which award prizes or result in coin forfeiture.

Referring now to FIGS. 6, 7, 8 and 9 further embodiments of the conveyor playing surface are illustrated. In FIG. 6 a conveyor playing surface 90 is segmented into individual belts extending between rollers 64 and 66. At one end of the segmented conveyor playing surface 90 a pivotal chute 26 deposits coins, tokens or other objects on the segmented conveyor playing surface which objects either fall through the spaces 104, 106, 108, 110 and 112 between the individual belts or travel on segmented conveyor surface 90 to sensors 56 and 58 to activate the display 44 when sensors 56 and 58 are contacted as has heretofore been described. The segmented conveyor surface 90 includes belts 92, 94, 96, 98, 100 and 102 having corresponding spaces 104, 106, 108, 110 and 112 through which rolling coins or objects can fall. The spaces 104, 108, 110 and 112 can either provide coins lost to the house or returned to the player since they were not deposited properly on segmented conveyor playing surface 90.

Segmented conveyor playing surface 90 may include optional crossover lanes 114 and 116 to allow coins deposited on segmented conveyor surface 90 to move from belt 92 to belt 94 or from belt 96 to belt 98 without falling through spaces 104 or 108 when the coin, token or object is ejected from chute 26 at the proper time to prevent forfeiture of the coin. The conveyor playing surface 22 and the segmented conveyor playing surface 90 may also include optional diverters 117 which project above the substantially flat conveyor playing surface to capture, divert or direct coins, tokens or objects away from the path intended by the player.

Referring now to FIG. 9 a further embodiment of the invention utilizing conveyor playing surface 22 is illustrated wherein a conveyor playing surface 22 disposed between rollers 64 and 66 is programmed to move both in forward and rearward directions during the game. In this manner coins, tokens or objects deposited on conveyor playing surface 22 may either roll toward the target end 70 near roller 66 or move toward and fall off the player end near roller 64. In this embodiment of the invention coins, tokens or other flat sided objects would pass underneath staging area 42 at space 119 such as represented by coin or token 118. Coin or token 118 could either be a forfeiture coin or token or be allowed to strike optional targets disposed at the player end of the game during the timed sequence movement of rollers 64 and 66 in a counterclockwise rotation to move the conveyor player surface 22 in a forward direction or in a clockwise rotation to move the conveyor playing surface 22 in a rearward direction. Optional targets and sensors can be disposed at the player end for embodiments where the conveyor playing surface moves in a rearward direction or the coin or token can be returned to the player provides additional dimensions to the game.

Figure 10:
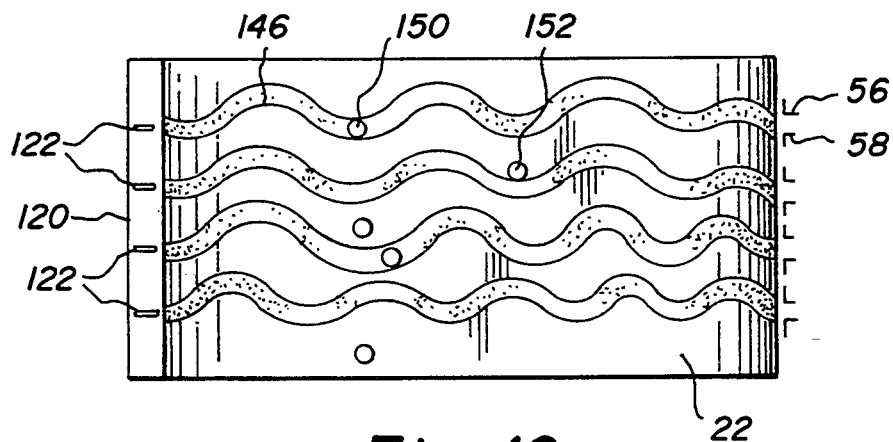
FIG. 10 is a top plan view of a further embodiment of the conveyor playing surface game with a further modification of the means for depositing coins on the conveyor player surface.

The optional staging area 42 may be utilized alone or in conjunction with pivotal chute 26 to deposit coins, tokens or other objects 28 onto conveyor playing surface 22. The optional staging area 42 may itself include a stack or an arrangement of one or more objects such as coins, tokens or objects which must first be struck or pushed onto conveyor playing surface 22 by a means for depositing coins, tokens or objects on the conveyor playing surface such as a pivotal chute or other mechanism for depositing coins along the width of the conveyor playing surface 22. Other such means for depositing coins, tokens or objects on the conveyor playing surface include a multi slotted chute 120 as illustrated in FIG. 10. Multi slotted chute 120 includes a plurality of coin or token inserts 122 for depositing a coin, token or other object on conveyor playing surface 22 at various points along the width of the conveyor playing surface. The various means for depositing coins, tokens or objects along the width of the conveyor playing surface can be employed with or without an optional staging area 42.

Referring now to FIGS. 7 and 8 a further embodiment of the invention is illustrated in which a plurality of conveyor playing surfaces are utilized. In FIGS. 7 and 8 three separate conveyor playing surfaces 124, 126 and 128 are visible under cover 24 to form the conveyor playing surface. Conveyor surface 124 includes a roller 130 and roller 132 for providing the first conveyor playing surface 124. The first conveyor playing surface may be either a unitary conveyor belt or may be segmented into a plurality of segments as illustrated in FIG. 7 with or without optional crossover lanes 114 and 116 as has been described with respect to FIG. 6. A second pair of rollers 134 and 136 are utilized to carry the second conveyor playing surface 126. A third set of rollers 138 and 140 are utilized to carry the third conveyor playing surface 128.

The first, second and third conveyor playing surfaces 124, 126 and 128 respectfully can move either in a forward or reverse direction and may be sequenced so that coins, tokens or objects 28 deposited on the first conveyor playing surface need to be deposited at a particular place at a particular angle and at a particular time in order for the object 28 to successfully reach the second conveyor playing surface and the third conveyor playing surface. Improperly placed or sequenced objects can be made to fall through the spaces between the lanes or move toward the player on the first, second or third conveyor surface and underneath a space 142 or 144 to be forfeited or returned to the player. Coins, tokens or objects properly placed and timed are designed to transit the first, second and third conveyor surfaces and contact sensors 56 and 58 to result in the award of tickets 80 or other coins, tokens or objects as prizes. As in other embodiments of the invention first, second and third conveyor playing surfaces 124, 126 and 128 respectively may include surface ornamentation to assist the player in properly positioning and time sequencing an object on the conveyor playing surface.

The conveyor playing surface 22 may be segmented and include any variety of geometric shapes and figures disposed on the moving conveyor playing surface to identify a particular location for time sequencing and positioning a coin, token or other object in order to contact sensors 56 and 58. These surface ornamentation shapes may be in the form of human, animal, geographic or geometric figures on the conveyor playing surface. For example the conveyor playing surface 22 may include wavy lines as illustrated in FIGS. 10 and 11 to simulate ocean waves or sine curves which move as part of the conveyor playing surface on which coins are deposited utilizing pivotal chute 26 or a multi slotted chute 120 (FIG. 10).

Figure 11:
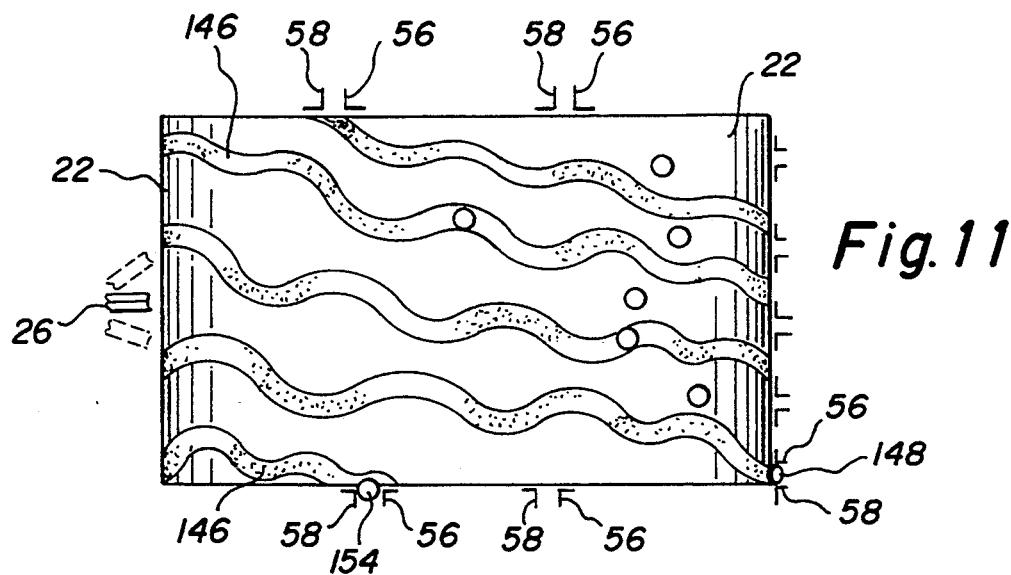
FIG. 11 is a top plan view of a further embodiment of the conveyor playing surface illustrating a sequenced movement of targets.

In embodiments of the invention where time sequencing in the placement of the object on the conveyor playing surface is important sensors 56 and 58 may be synchronously sequenced by switching ON and OFF sensors 56 and 58 in timed sequence with the motion of the conveyor playing surface so the target sensors 56 and 58 are activated only when a coin, token or object is on a particular time sequenced spot which momentarily comes into alignment with sensors 56 and 58 such as illustrated by coin 148 in FIG. 11. At other times when the spot or portion of the wave is not in alignment with sensors 56 and 58 the sensor switch can be turned OFF so that out of position coins or tokens do not result in the lighting up of the display 44 or the award of tickets 80.

It will be recognized by those skilled in the art the net effect of turning of the sensors ON and OFF can also be accomplished mechanically by synchronously moving sensors 56 and 58 laterally with respect to conveyor playing surface 22 by mounting sensors 56 and 58 on a movable rack (not shown) which moves to the right or the left in synchronization with the advancement of the conveyor playing surface to accomplish the same result. In either embodiment the coin or token deposited on the conveyor playing surface 22 is required to be deposited in the confines of the wavy line such as token 150 (FIG. 10) or riding on the outside of the wave to simulate surfing activities such as is illustrated by coin or token 152 in FIG. 10.

Side lights 82 and 84 may also be utilized to display the hitting of targets disposed at the sides adjacent the player end as illustrated by sensors 56 and 58 which are disposed along the sides of the conveyor playing surface (FIG. 11). In such embodiments the placement of an object 154 in wavy line 146 would result in the object 154 hitting sensors 56 and 58 at the side adjacent to the player end resulting in side lights 84 (FIG. 3) being activated along with the lighting of display 44 and the award of tickets 80 from ticket dispenser 50. Conveyor playing surface 22 in FIGS. 10 and 11 can move in a forward or reverse direction and may be segmented as heretofore described with respect to FIGS. 6, 7 and 8. In segmented embodiments the various lanes can move in forward and reverse directions at different directions and relative rates of speed to test or impart skills in relative motions with respect to moving objects.

Figure 12:
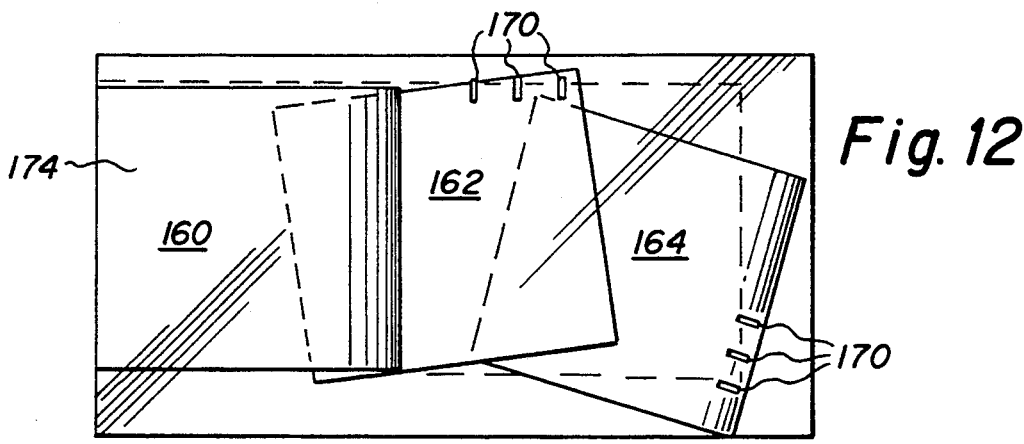
FIG. 12 is a top plan view of a further embodiment of the novel conveyor playing surface game employing a plurality of conveyors.
Figure 13:
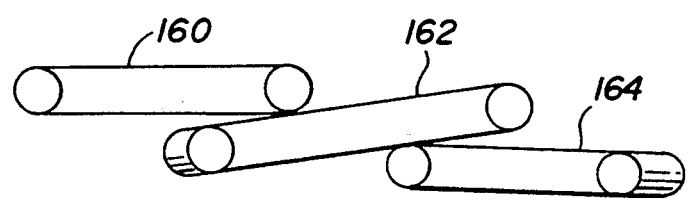
FIG. 13 is a side elevational view of the embodiment of FIG. 12.

Referring now to FIGS. 12 and 13 a multi-tiered conveyor playing surface made up of three conveyor surfaces 160, 162 and 164 is illustrated wherein conveyor surfaces 160, 162 and 164 are not in axial coalignment so that coins, tokens or objects deposited on conveyor surface 160 move at angles as the object travels from conveyor surface 160 to conveyor surface 162 and finally conveyor surface 164 and one or more targets 170 disposed at the target end of the conveyor playing surface. Targets 170 may be disposed at the side opposite to the player end or at a side adjacent to one of the conveyor surfaces such as conveyor surface 162 as illustrated in FIG. 12 through transparent cover 174. Conveyor surface 160 may also be inclined with respect to conveyor surfaces 162 and 164 or conveyor surfaces 162 and 164 may be inclined with respect to conveyor surface 160 as illustrated in FIG. 13.

The relative angle of incline of each of the conveyor surfaces provides a cascading effect which further increases the aspect of skill required to place a coin, token or other moving object onto the conveyor playing surface to strike a particular target. The relative angles of incline may be coupled with diverters or obstacles such as diverter 117 (FIG. 6) to assist in the capture of the object as it moves up and down inclines on a multi tiered conveyor playing surface to impart or test the skill of the player on the effect of relative movements and inertia of various objects placed on the moving conveyor playing surface.

Figure 14:
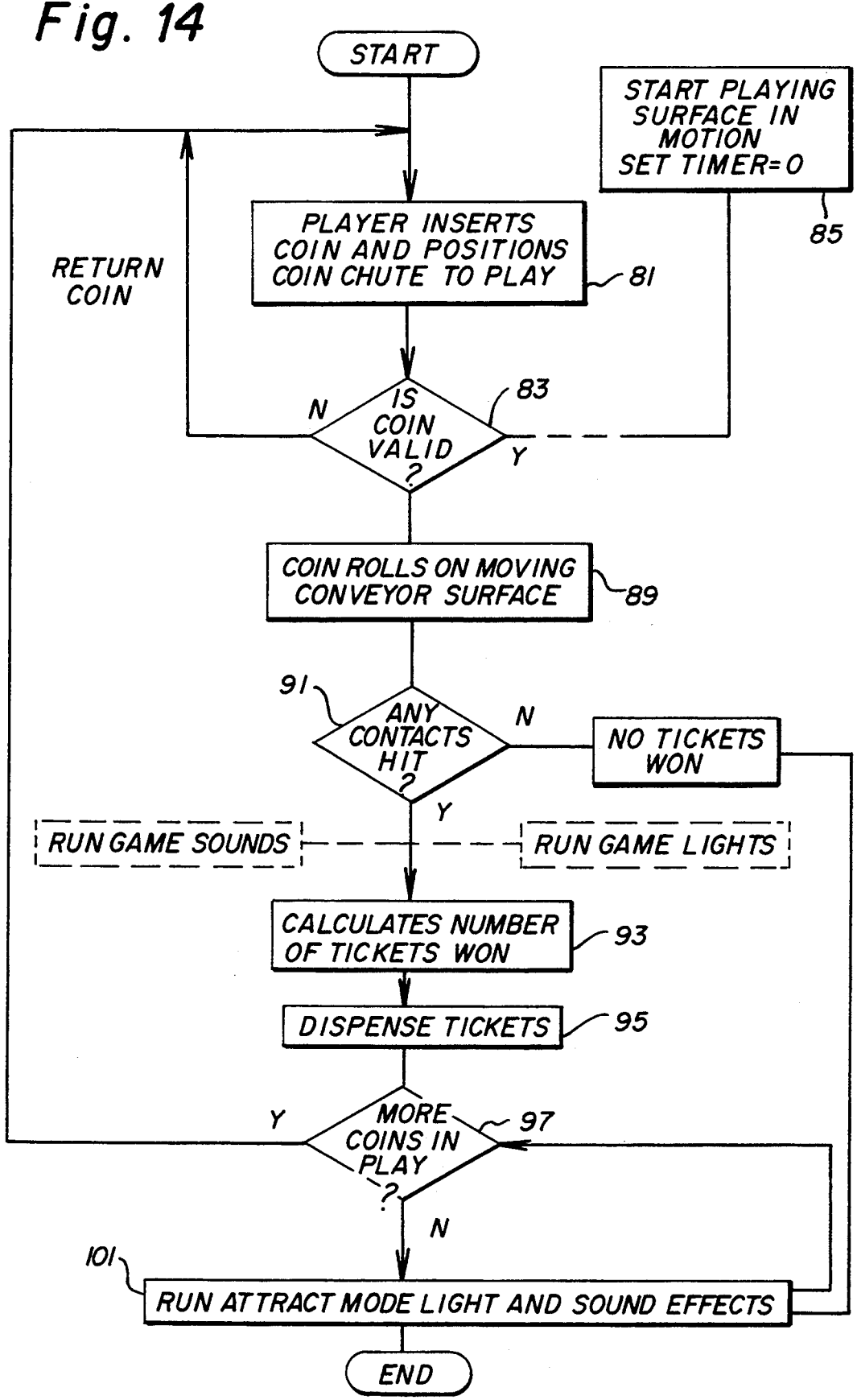
FIG. 14 is a flow chart illustrating one system for operating a conveyor playing surface game constructed in accordance with the invention.

The novel conveyor playing surface game may be run utilizing various types of computer programs other than illustrated in FIGS. 15A, 15B and the Appendix Item. For example FIG. 14 illustrates one form of a simplified logic that may be used to run the conveyor playing surface game of the invention. The game is started by inserting a coin or token as represented by block 81. In the event the coin is damaged or invalid the coin is returned to the player as indicated by block 83. If the coin is valid the conveyor playing surface is started in motion as represented by block 85. The player aims the pivotal chute and directs a rolling coin or token onto the moving conveyor playing surface as represented by block 89. Sensors 56 and 58 determine if the target has been hit by the coin or token as represented by block 91. If a target has not been hit attract lights in display 44 and speaker 48 may be activated as indicated by block 101.

The successful hitting of a target as determined by sensors 56 and 58 can result in the running of game sounds through speaker 48, the running of game lights in the display 44 as well as side lights 82 and 84. The microprocessor calculates the number of tickets won as represented by block 93 as well as activating the ticket dispenser 50 as well as activating the ticket dispenser 50 as represented by block 95.

After ticket dispenser 50 dispenses tickets as represented by block 95 the microprocessor determines if additional coins are in play as represented by block 97. If more coins have been inserted the game returns to block 81 and 83 to activate the coin accept mechanism to determine whether or not the coin is valid as well as repeating the steps as heretofore described. In the event additional coins are not in play the attract mode lights and sound effects can be run periodically as represented by block 101.

Referring now to FIGS. 15A and 15B a flow chart of the logic and FIG. 16 a circuit diagram are illustrated in accordance with the preferred embodiment of the invention. The schematic diagram of the electrical circuitry for operating the speaker lights, ticket mechanism and conveyor motor is illustrated in FIG. 16. The associated logic for the microprocessor for operating the game is illustrated in FIG. 15A and 15B in which the conveyor playing surface is constantly in motion operated by motor 193 (FIG. 16) and the sound and display lights operate periodically as represented by blocks 181, 183, 185, 187, 189, 191 FIG. 15A.

The player starts play by inserting a coin or token as represented by block 180 FIG. 15B. If the coin is not valid the coin is returned as indicated by block 182 to allow the player to reinsert the coin or use another coin. If the coin is valid the coin switch is hit as represented by block 184 which results in the stopping of the attract sounds and lamps and the starting of the runway or side lights 82 and 84 as represented by block 186. The tilt switch is then checked as represented by block 188. If the switch is in the tilt condition the microprocessor performs the functions represented by blocks 195, 197 and 199 and returns the coin to the player. If the tilt switch is not in a tilt condition the game proceeds. The player aims the pivotal chute 26 resulting in the coin rolling onto the moving conveyor surface. Side lights 82 and 84 activated and sensors 56 and 58 determine if a coin has hit a target as indicated by block 190 (FIG. 15A).

If a target has been hit as determined by sensors 56 and 58 the microprocessor determines the number of tickets won, plays winner music through speaker 48, runs game lights in display 44, stops the running of side lights 82 and 84 and dispenses tickets 80 through ticket dispenser 50 as well as the other functions listed in block 192. If additional coins are in play the program returns to block 180 to repeat the foregoing steps. In the event additional coins are not in play the attract mode lights and sound effects are run periodically as represented by block 194. The microprocessor monitors both the tasks performed in FIG. 15B as well as the tasks performed in FIG. 15A. The tasks performed in FIG. 15B are performed upon the player's insertion of a coin after which the microprocessor coordinates the tasks of FIG. 15A with the tasks of FIG. 15B.

If a target has not been hit as determined by the target sensor means the microprocessor determines if there are any coins in the tracker as represented by block 196. If coins exist in the coin tracker then .the microprocessor performs the functions as represented by block 198. In the event there are no coins in the coin tracker the microprocessor determines if the game is in a tilt condition as represented by block 200. If the game is not tilted the game returns to the attract mode lights and sound condition as represented by block 194. These aspects of the game as well as the computer program for running the game are set forth in the Appendix Item.

In the mechanical operation of the novel game deposited coins are directed onto the conveyor playing surface and as a result of their inertia and the movement of the conveyor playing surface result in the advancement of the deposited coins to the target end of the conveyor playing surface. Thereafter the coins drop into a funnel shaped trough which moves the coin or tokens into a removable collection basket. In variations of the game a coin or token recovery system could involve coins being directed into a coin pay out hopper which would provide pay out coins based on values awarded. When the pay out hopper reaches maximum capacity coins would overflow into a removable collection bucket or as part of the prizes awarded to the successful player.

The conveyor playing surface is driven by a single $4\frac{1}{2}$ inch diameter power roll motorized pulley with a 2 inch diameter idler pulley. The conveyor incorporates a belt tracking adjustment mechanism with a belt centering roller system to maintain the conveyor belt in a substantially centered position. The game in the preferred embodiment includes runway or side lights with eight lights per side. The conveyor belt and art work are confined within the cabinet and sealed from the player utilizing tempered glass. The interior art work may be screened to the conveyor playing surface to allow the full benefit of backlighting. As heretofore indicated the art work on the conveyor playing surface may be modified in a number of different ways to provide different visual effects and utilize spot or lane locators upon which an object must come to rest in order to strike a particular target having a particular point value.

The conveyor playing surface in the best mode is divided up into nine different lanes which may be part of a single conveyor playing surface or may be physically segmented to allow the lanes to move at different rates and directions in relation to one another as well as at different speeds by the utilization of gearing or different size pulleys known to those skilled in the art. The conveyor belt playing surface is typically designed to move at approximately thirty to thirty-five feet per minute in a direction away from the player but may move at other speeds and in different relative directions and may include more than one conveyor playing surface as has heretofore been described.

The mechanism for depositing a moving object such as a coin, token or other three dimensional object such as spherical, cylindrical or other shaped objects onto the playing surface may be accomplished with a pivotable object chute which may be pivotable within an eighty degree arc onto the conveyor playing surface. The game and mechanism for depositing a moving object on the conveyor playing surface may be designed to include multiple players. The sensors at the target end of the conveyor playing surface may utilize metal contact wiper blades spaced in accordance with predetermined centers based upon the diameter of a specific coin, token or object used and may be fixed or be disposed on a rack for moving laterally with respect to the moving conveyor player surface as has heretofore been described.

The movement of the conveyor playing surface can also be time sequenced with the target to require the placement of the object on a particular spot as opposed to lane on the conveyor playing surface. The novel conveyor playing surface may utilize any type of conveyor belt and may utilize coin or token diverters projecting from the conveyor belt alone or together with cross over lanes on the conveyor playing surface as heretofore described.

The conveyor playing surface may also as heretofore discussed be modified to include a staging area which is piled with coins, tokens or other objects so that the introduction of the new coin, token or object to the staging area results in one or more of the coins on the staging area being pushed out onto the conveyor playing surface or the targets. The staging area may be disposed anywhere along the length of the conveyor playing surface. These and other aspects of the invention including the use of optical sensors may be employed with the conveyor playing surface in accordance with the invention.

As will be recognized by those skilled in the art the present invention may be modified a number of ways by those skilled in the art to utilize the novel conveyor playing surface in combination with stationary or rolling objects that are deposited on the conveyor playing surface whereby the inertia of the object in combination with the conveyor playing surface carries the object to the target. The target end may also be modified so that the targets can be either stationary or may be moved electronically or mechanically in relation to a particular sequenced position on the conveyor player surface. The game may also utilize multiple coin chutes so that a number of players can simultaneously deposit coins, objects or tokens onto the conveyor player surface and compete or block each other in an effort to strike a particular target at the target end of the conveyor playing surface.

The game may be modified to utilize many different types of conveyor playing surfaces which teach or test the relative movement of objects deposited on the moving conveyor playing surface which require a timed or sequenced relationship in order to strike a particular target. It will also be apparent to those skilled in the art the conveyor playing surface may be changed or modified utilizing crossovers, obstacle pits such as may be utilized in cross country racing and golf courses as well as various types of surface ornamentation to create a number of variations of the conveyor playing surface game. These and other variations of the invention may be made including the electronic sequencing or movement of target values in relation to the sequencing of the conveyor playing surface to increase or decrease the level of difficulty and skill required to strike a particular target. It will be appreciated these and other such modifications can be made within the spirit and scope of the invention as defined in the following claims.

What is claimed is:

1. A game having a moving playing surface comprising:
   (a) a housing having a player end and a target end and a transparent cover;
   (b) a movable conveyor playing surface formed by an endless conveyor belt disposed between said player end and said target end and visible through said transparent cover said endless conveyor belt supported by at least two rollers and movable between said at least two rollers;
   (c) an object chute for depositing an object at a selected location along the width of said movable conveyor playing surface;
   (d) a target disposed at said target end of said movable conveyor playing surface; and
   (e) microprocessor means for operating said game and awarding rewards based upon the level of difficulty in striking said target.

2. The game of claim 1 wherein said movable conveyor playing surface is inclined downwardly toward said target end to allow a rollable object to advance to said target by a combination of the inertia of said object and the movement of said movable conveyor playing surface.

3. The game of claim 1 wherein said moveable conveyor playing surface is axially segmented into a plurality of lanes.

4. The game of claim 3 wherein said axially segmented moveable conveyor playing surface includes means for separately moving each of said plurality of lanes.

5. The game of claim 4 wherein said means for separately moving each of said plurality of lanes moves said plurality of lanes in different directions.

6. The game of claim 1 wherein said movable conveyor playing surface is made up of a plurality of separate conveyors each having a separate endless conveyor belt disposed between said player end and said target end.

7. The game of claim 1 wherein said object chute includes multiple openings for depositing an object along the width of said moveable conveyor playing surface.

8. The game of claim 1 wherein said object chute is pivotal for angularly depositing an object along the width of said moveable conveyor playing surface.

9. The game of claim 1 wherein a plurality of targets are disposed in said target end.

10. The game of claim 9 wherein said awarding rewards based on the level of difficulty of striking said targets is electronically changed by said microprocessor means in sequence with the movement of said movable conveyor playing surface.

11. The game of claim 1 further comprising an object staging area disposed between said object chute and said movable conveyor playing surface.

12. The game of claim 11 further comprising an object staging area disposed between said target and said movable conveyor playing surface.

13. The game of claim 1 further comprising an object staging area disposed between said object chute and said target.

14. A coin or token game having a movable playing surface comprising:
   (a) a housing having a player end and a player score display end;
   (b) a movable conveyor playing surface formed by an endless conveyor belt disposed in said housing between said player end and said player score display end and supported by at least two rollers;
   (c) means for depositing moving objects on said movable conveyor playing surface;
   (d) a target disposed at one of the sides of said movable conveyor playing surface; and
   (e) microprocessor means for operating the game and calculating scores based upon the level of difficulty in striking said target.

15. The coin or token game of claim 14 wherein said conveyor playing surface is inclined downwardly toward said target to allow the inertia of the moving object in combination with the motion of said movable conveyor playing surface determine the path of said moving object.

16. The coin or token game of claim 15 wherein said movable conveyor playing surface is movable toward said player score display end and said player end.

17. A moving surface game comprising:
   (a) a housing having a player end and a target end and a transparent cover for covering the playing surface;
   (b) a movable conveyor belt playing surface disposed between said player end and said target end;
   (c) means for depositing objects on said movable conveyor belt playing surface; and
   (d) at least one target disposed at said target end of said housing.

18. The moving surface game of claim 17 wherein said means for depositing objects on said movable conveyor belt playing surface is a pivotal coin chute.

19. The moving surface game of claim 17 wherein said means for depositing objects on said movable conveyor belt playing surface is a plurality of openings disposed along the width of said player end.

20. The moving surface game of claim 17 further comprising a staging area disposed between said means for depositing objects and said at least one target.

* * * * *